US006964830B2

(12) United States Patent
Takahashi

(10) Patent No.: US 6,964,830 B2
(45) Date of Patent: Nov. 15, 2005

(54) LITHIUM SECONDARY BATTERY

(75) Inventor: Michio Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 366 days.

(21) Appl. No.: 10/052,226

(22) Filed: Jan. 17, 2002

(65) Prior Publication Data
US 2002/0150819 A1 Oct. 17, 2002

Related U.S. Application Data

(63) Continuation-in-part of application No. 09/613,127, filed on Jul. 10, 2000, now abandoned.

(30) Foreign Application Priority Data

Jul. 30, 1999 (JP) ............................................ 11-216794

(51) Int. Cl.$^7$ ................................................ H01M 2/00
(52) U.S. Cl. ............................ 429/231.95; 429/218.1; 429/223; 429/224
(58) Field of Search ................................ 429/223, 224, 429/221, 220, 593, 594, 596, 598, 599, 231.95, 218.1, 219, 229, 231.5

(56) References Cited

U.S. PATENT DOCUMENTS

| | | | |
|---|---|---|---|
| 5,084,366 A | | 1/1992 | Toyoguchi |
| 5,240,794 A | | 8/1993 | Thackeray et al. |
| 5,425,932 A | | 6/1995 | Tarascon |
| 5,718,877 A | | 2/1998 | Manev et al. |
| 6,080,510 A | * | 6/2000 | Hemmer et al. ............ 429/224 |
| 6,267,943 B1 | | 7/2001 | Manev et al. |
| 6,280,699 B1 | | 8/2001 | Manev et al. |
| 6,368,750 B1 | * | 4/2002 | Nemoto et al. ........ 429/231.95 |

FOREIGN PATENT DOCUMENTS

| | | |
|---|---|---|
| EP | 0 797 263 A2 | 9/1997 |
| EP | 0 885 845 A1 | 12/1998 |
| JP | 4-141954 | 5/1992 |
| JP | 06-187993 | 7/1994 |
| JP | 08-002921 | 1/1996 |
| JP | 09-161800 | 6/1997 |
| JP | 09-270259 | 10/1997 |
| JP | 10-241691 | 9/1998 |
| JP | 11-007956 | 1/1999 |
| JP | 11-045711 | 2/1999 |
| JP | 11-071115 | 3/1999 |
| JP | 11-073960 | 3/1999 |
| JP | 11-073962 | 3/1999 |
| JP | 11-191416 | 7/1999 |
| JP | 11-288713 | 10/1999 |
| JP | 2000-030706 | 1/2000 |
| JP | 2000-048818 | 2/2000 |
| JP | 2000-058058 | 2/2000 |
| JP | 2000-113889 | 4/2000 |

OTHER PUBLICATIONS

Yamada, Atsuo et al., "Synthesis and Structural Aspects of $LiMn_2O_{4\pm\delta}$ as a Cathode for Rechargeable Lithium Batteries," J. Electrochem. Soc., vol. 142, No. 7, Jul. 1995, pp 2149–2156.

Atsuo Yamada et al., "Synthesis and structural aspects of Li2Mn2O4 as a cathode for rechargeable lithium batteries," J. Electrochem. Soc., vol. 142, No. 7, Jul. 7, 1995, pp. 2149–2156.

* cited by examiner

Primary Examiner—Michael Barr
Assistant Examiner—Monique Wills
(74) Attorney, Agent, or Firm—Burr & Brown

(57) ABSTRACT

A lithium secondary battery using lithium manganese oxide as a positive active material and having excellent charge and discharge cycle properties.

As a positive active material of a lithium secondary battery, lithium manganese oxide having a cubic spinel structure, in which the strength ratio ($P_2/P_1$ strength ratio) of the primary endothermal peak ($P_1$) appearing around 950° C. and the secondary endothermal peak ($P_2$) appearing around 1100°0 C. in differential thermal analysis is under 1, is used.

5 Claims, 1 Drawing Sheet

Example 1

Comparative Example

LITHIUM SECONDARY BATTERY

CROSS REFERENCE TO RELATED APPLICATIONS

This application is a continuation-in-part of U.S. patent application Ser. No. 09/613,127, filed Jul. 10, 2000, now abandoned the entirety of which is incorporated herein by reference.

This application claims priority from Japanese Application No. 11-216794, filed in Japan on Jul. 30, 1999, the entirety of which is incorporated herein by reference.

BACKGROUND OF THE INVENTION AND RELATED ART STATEMENT

The present invention relates to a lithium secondary battery, in which a positive active material is lithium manganese oxide, which has excellent charging and discharging cycle properties.

In recent years, miniaturization and reduction of weight has been accelerated for such portable electronic instruments as a portable phone, a VTR, and a note-type PC. As a cell for an electric power source, a secondary battery, in which complex oxide made of lithium and a transition element, carbon material, and an organic electrolyte solution prepared by dissolving an Li ion electrolyte in an organic solvent are used for the positive active material, negative active material, and the electrolyte, respectively, is being used.

Such battery is normally named as lithium secondary battery or lithium ion battery and has features of a high energy density and a high single-cell voltage as about 4 V. Thus, the lithium secondary battery attracts attention as an electric power source of not only said portable electronic instruments, but also electric vehicles (hereafter, EV) or hybrid electric vehicles (hereafter HEV) which are expected to become popular to the public as a low pollution automobile on the basis of the latest environmental problems.

In such a lithium secondary battery, cell capacity and charge and discharge cycle properties (hereafter, cycle properties) largely depend on material characteristics of the positive active material used. Here, the complex oxide made of lithium and a transition element used as the positive active material is specifically exemplified by lithium cobalt oxide ($LiCoO_2$), lithium nickel oxide ($LiNiO_2$), and lithium manganese oxide ($LiMn_2O_4$) or the like.

SUMMARY OF THE INVENTION

Among them, lithium manganese oxide spinel (stoichiometric composition: $LiMn_2O_4$) has features of a low raw-material cost, a large output density, and a high electric potential. On the other hand, the following is a problematic defect: discharge capacity gradually decreases as charge and discharge cycles are repeated, thus it is difficult to yield good cycle properties.

Li ions are released from the positive active material or inserted in the positive active material by charge or discharge. Here, crystalline structural change of the positive active material becomes irreversible. Thus, apart of Li ions do not contribute to battery reaction after a repeat of charge and discharge cycles. This may be a major cause of a reduction in discharge capacity.

Therefore, the inventors carried out various studies to intend to stabilize the crystal structure of lithium manganese oxide spinel. As a result, we found that the cycle property is improved when lithium manganese oxide spinel having a given thermal property is used for the positive active material. We have established a manufacturing method for lithium manganese oxide spinel having such a thermal property.

The present invention provides a lithium secondary battery, characterized in that lithium manganese oxide is used as a positive active material having a cubic spinel structure of which strength ratio ($P_2/P_1$ strength ratio) of a primary endothermal peak ($P_1$) appearing around 950° C. and a secondary endothermal peak ($P_2$) appearing around 1100° C. in differential thermal analysis is under 1.

Here, it is more preferable that said strength ratio is lower than 0.5. It is also preferable that Li/Mn ratio is over 0.5 in lithium manganese oxide. Such lithium manganese oxide can be yielded by firing a mixture of salt and/or oxide of respective elements adjusted to a given proportion in an oxidation atmosphere, under a temperature in the range of 650 to 1000° C., and for a duration between 5 hours and 50 hours. In such a manufacturing method, firing is preferably carried out twice or more. Preferably, firing temperature is gradually increased as the number of times of firing increases.

DETAILED DESCRIPTION OF PREFERRED EMBODIMENT

Figure 1A:
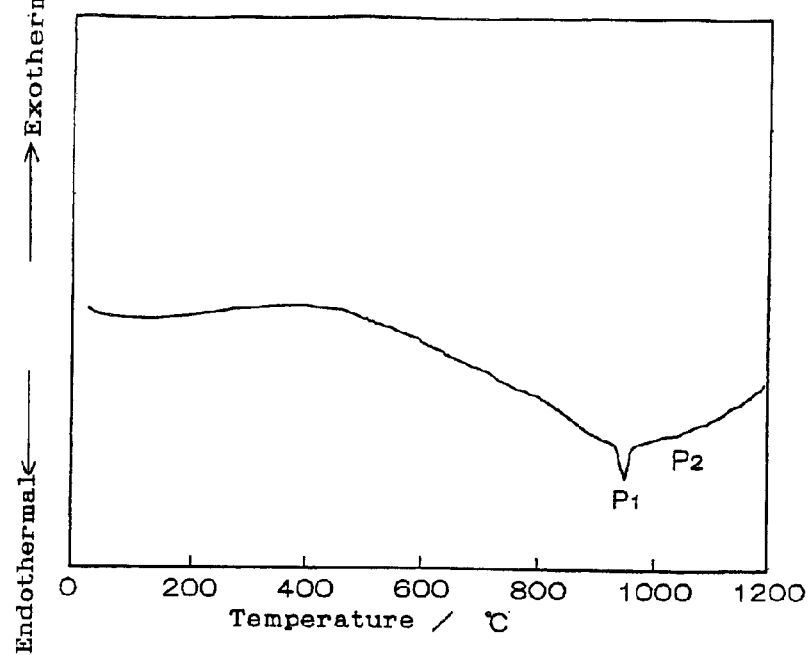
FIG. 1(a) is a graph showing the result of thermal analysis for Example 1 and FIG. 1(b) is for the Comparative Example, respectively.
Figure 1B:
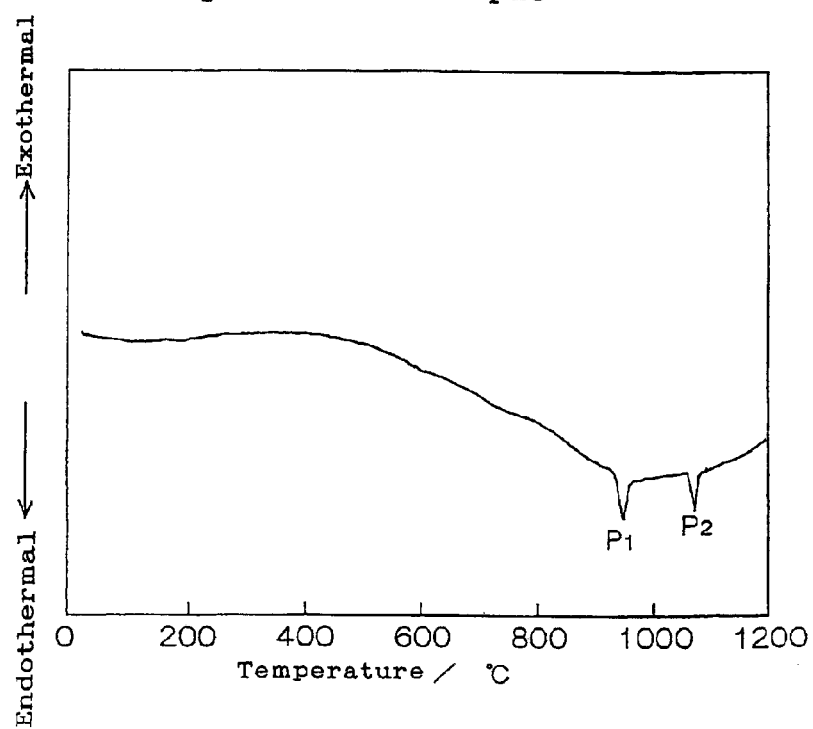

In the lithium secondary battery according to the present invention, lithium manganese oxide, which has a cubic spinel structure, (hereafter, simply using lithium manganese oxide) is used as the positive active material. Here, a stoichiometric composition is represented by $LiMn_2O_4$. However, the present invention is not restricted to lithium manganese oxide having such a stoichiometric composition, but those, in which a part of Mn, a transition element, is substituted by other one or more elements M, is also preferably used.

When a part of Mn of lithium manganese oxide $LiMn_2O_4$ with a stoichiometric composition is substituted by one element M, the general formula is expressed by $LiM_xMn_{2-x}O_4$ (X represents a substituted amount). When such element substitution is carried out, the Li/Mn ratio (molar ratio) is $(1+X)/(2-X)$ in the case where Mn is substituted by Li and Li is excessive, and $1/(2-X)$ in the case where Mn is substituted by an element M other than Li. In either case, always the Li/Mn ratio >0.5 is held. Thus, according to the present invention, those showing the Li/Mn ratio over 0.5 are more preferably used.

When a part of Mn of lithium manganese oxide $LiMn_2O_4$ according to stoichiometric composition is substituted by two or more elements $M_1, M_2, \ldots, M_m$, the general formula is expressed by $Li(M_{1(x1)}, M_{2(x2)}, M_{m(xn)})_xMn_{2-x}O_4$ (X represents a substituted amount; a sum of X1 to Xn is 1). Also in this case, the Li/Mn ratio >0.5 is held. Thus, according to the present invention, substitution of Mn by a plurality of, two or more, elements is more preferable.

The substitution element M is exemplified by Li, Fe, Mn, Ni, Mg, Zn, B, Al, Co, Cr, Si, Ti, Sn, P, V, Sb, Nb, Ta, Mo, and W. Here, of these substitution elements M, theoretically, Li becomes +1 valent, Fe, Mn, Ni, Mg, and Zn are +2 valent, B, Al, Co, and Cr are +3 valent, Si, Ti, and Sn are +4 valent, P, V, Sb, Nb, and Ta are +5 valent, and Mo and W are +6 valent ions. All these elements show a mixed crystal in $LiMn_2O_4$. Co and Sn may be +2 valent, Fe, Sb, and Ti may be +3 valent, Mn may be +3 and +4 valent, and Cr may be +4 and +6 valent.

Therefore, various species of substitution element M may exist in a condition having a mixed valence. The amount of oxygen is not necessarily 4 as expressed by theoretical chemical composition and may exist in defect or excessive condition in a range of maintaining the crystal structure.

According to the present invention, lithium manganese oxide having various compositions as described above and showing characteristics, in which strength ratio ($P_2/P_1$ strength ratio) of a primary endothermal peak ($P_1$) appearing around 950° C. and a secondary endothermal peak ($P_2$) appearing around 1100° C. is under 1 in differential thermal analysis, used as the positive active material. These endothermic peaks $P_1$ and $P_2$ are considered to show a phase change of lithium manganese oxide.

The differential thermal analysis is a method to detect chemical changes accompanying thermal transfer, which occurs in a sample according to a rise in temperature, on the basis of endothermic peak and exothermic peak. Normally, the measurement is conducted simultaneously with thermogravimetric analysis by using a thermobalance.

The differential thermal analysis can be conducted in various gas atmospheres by sending a given gas to the sample or mounting the apparatus itself in a glove box. The condition of measurement of the differential thermal analysis according to the present invention is based on an air atmosphere (simply, atmosphere) under an atmospheric pressure.

Concerning lithium manganese oxide, there is, for example, a report as published on "Atsuo Yamada et al. (July, 1995) J. Electrochem. Soc. Vol. 142, No. 7, p. 2149–2156. Synthesis and Structural Aspects of $LiMn_2O_4 \pm \delta$ as a Positive Electrode for Rechargeable Lithium Batteries," in that various change in oxygen concentration in a measurement atmosphere allowed a change in shape of a curve yielded from the differential thermal analysis and the shift or disappearance of a position of the endothermic peak regarded as showing the same chemical change.

If the atmosphere of the gas to be measured is not constant, the primary endothermal peak and the secondary endothermal peak cannot be defined. Therefore, the measurement in the present invention is conducted principally in an atmosphere. Meanwhile, the appearance of the primary endothermal peak and the secondary endothermal peak of the present invention are observed at least in a temperature rising process in the differential thermal analysis.

As a rule, in a case of a given rate of temperature rise of a sample in which an apex of the endothermal peak occurs at 950° C., when measurement is carried out in the rate of temperature rise lower than that of the given rate of temperature rise, the endothermal peak shifts to a higher temperature. In contrast, when measurement is carried out in the rate of temperature rise higher than the given rate of temperature rise, the endothermal peak shifts to a lower temperature. As the result of the differential thermal analysis, the rate of temperature rise should also be determined in order to define the positions of the primary endothermal peak and the secondary endothermal peak, because the position, where the endothermal peak occurs, shifts according to the rate of temperature rise in the differential thermal analysis.

Therefore, in the present invention, the primary endothermal peak is defined as an endothermal peak appearing around 950° C. and the secondary endothermal peak is defined as an endothermal peak appearing around 1100° C., in the case where the temperature rising rate is 5° C./min. The term "around" is used for description in consideration of the shift in the peak position according to the temperature rising rate as described above. The condition of the peak strength ratio according to the present invention applied between two endothermal peaks appearing in the case where the temperature rising rate is 5° C./min. can be naturally applied even when endothermal peak position shifts after changing the temperature rising rate.

In the case where $P_2/P_1$ strength ratio, which is a strength ratio of the primary endothermal peak ($P_1$) and the secondary endothermal peak ($P_2$) measured under the given condition as described above, in other terms, a ratio yielded by dividing $P_2$ strength by $P_1$ strength, is lower than 1, a good cycle property is yielded as shown in an example described later. The peak strength is not a peak area, but a distance from a base line to the apex of the peak; more specifically, the length of a normal from the apex of the endothermal peak to a line, when the point of starting the rise of the endothermal peak is connected to the point of the end of the peak with the line.

The differential thermal analysis curve for lithium manganese oxide with 20% oxygen concentration described in "J. Electrochem. Soc." previously cited is very similar to the differential thermal analysis curve of an example described hereinafter; the $P_2$ strength is almost equal to the $P_1$ strength. It is shown that although the conventional lithium manganese oxide showing such peak strength scarcely differs in the $P_1$ strength from lithium manganese oxide satisfying the requirement of the peak strength according to the present invention, there is a great difference in the $P_2$ strength. From the comparison of examples with Comparative Examples as described later, it is considered that lithium manganese oxide with a small $P_2$ strength shows a stable crystal structure and a good cycle property.

The following description is for the method of synthesizing lithium manganese oxide having thermal properties as described above. Salt(s) and/or oxide(s) of respective elements (including a substituting element M in the case where element substitution is carried out) are used as raw materials of synthesis. The salts of respective elements are not specially restricted, but those having a high purity and requiring a low cost are preferably used as the raw materials. It is preferable to use carbonates, hydroxides, organic acid salts which generate no harmful decomposition gases in temperature rise and firing. However, nitrates, hydrochlorides, and sulfates are also usable. Among raw materials of Li, $Li_2O$, that is an oxide, is strongly hygroscopic and difficult to handle, and thus its chemically stable carbonate is preferably used.

A mixture of such raw materials in a given proportion is first burnt in an oxidization atmosphere, under a temperature ranging from 650° C. to 1000° C. for 5 to 50 hours. Here, an oxidization atmosphere is, generally, the atmosphere having an oxygen partial pressure under which the sample in a furnace normally initiates an oxidization reaction. Specifically, the atmosphere and an oxygen atmosphere are those.

Homogeneity of the composition is not always good after the first firing. In the case where Li/Mn ratio >0.5 is satisfied, i.e., element substitution is carried out for Mn in the stoichiometric composition, it was found experimentally that a product having a given thermal property becomes easy to yield by one firing operation particularly for a composition with excessive Li prepared by substitution of a part of Mn by Li, Ti, and Mg. The reason for it is not clear, but it is assumed that crystal structure is stabilized by the addition of the substitution element M.

As described above, a part of categories of compositions allows synthesis of lithium manganese oxide showing the given thermal property only by one firing. However, preferably, firing is separately carried out in a plurality of times in order to establish a synthesis condition not influenced by composition.

The number of times of firing greatly depends on firing temperature and firing duration. Larger times of firing are necessary for a lower firing temperature and/or a shorter firing duration. According to species of the substitution element M, the number of times of firing may be preferably increased in view of making an even composition. This case is that addition of the substitution element M does not allow forming phase atmosphere suitable for the growth of crystals.

However, increase in the number of times of firing requires a longer production process. Therefore, it is preferable that the number of times of firing is limited to the least necessary. In comparison with the sample yielded by firing once, the sample yielded by a plurality of times of such firing shows a sharp, projected peak on XRD chart. By this fact, improved crystallinity can be confirmed.

A firing temperature lower than 600° C. yielded a peak, e.g. the peak of $Li_2CO_3$ in use of lithium carbonate ($Li_2CO_3$) as the lithium source, showing a remaining raw material on the XRD chart of the burnt matter. In this case, a monophasic product is not yielded. On the other hand, a firing temperature as higher than 1000° C. did not yield the monophasic product, but yielded a high temperature phase other than an objective crystalline compound.

In lithium manganese oxide as described above and according to the present invention, the crystal structure is stabilized and the cycle property is improved in using it as the positive active material of the lithium secondary battery. Such improved cycle property appears particularly prominent in a large capacity battery using a large quantity of electrode active material. Thus, usage thereof is exemplified by a motor actuating power source for EV and HEV. However, the present invention can be naturally used for a small capacity battery such as a coin-type battery.

Various materials so far known can be used for other members (material) used in the lithium secondary battery, in which lithium manganese oxide according to the present invention is used as the positive active material. For example, amorphous carbon materials such as soft carbon and hard carbon and highly graphitized carbon materials such as artificial graphite and natural graphite can be used as a negative active material. Among them, it is preferable to use highly graphitized carbon materials of which lithium capacity is large.

The usable organic electrolytic solutions are those in which one or more fluorine compounds of lithium complex such as $LiPF_6$ and $LiBF_4$ or lithium halogenate such as $LiClO_4$ as electrolytes are dissolved in a single solvent or a mixed solvent of such organic solvent as carbonate esters such as ethylene carbonate (EC), diethyl carbonate (DEC), dimethyl carbonate (DMC), propylene carbonate (PC) and γ-butyrolactone, tetrahydrofurane, and acetonitrile.

The structures of the batteries are exemplified by various batteries such as a coin-type battery, in which a separator is arranged between the positive active material and the negative active material is molded in a plate shape to be filled with an electrolytic solution, and cylindrical and box-type batteries made by using an electrode body made by winding through the separator or stacking around a positive plate, which is prepared by coating the positive active material over the surface of a metal foil, and a negative plate, which is prepared by coating the negative active material over the surface of a metal foil.

EXAMPLES

Subsequently, the examples of the present invention are described below. However, the present invention is not restricted to the following examples.

(Synthesis of Lithium Manganese Oxide)

As raw materials, powder of commercially available $Li_2CO_3$, $MnO_2$, $TiO_2$, $MgO$, and $NiO$ were used, and weighed and mixed to make the composition according to the Examples 1 to 3 and Comparative Example shown in Table 1, followed by firing in an atmosphere under the conditions described in the same Table 1. The samples of Examples 1 and 3 and the Comparative Example were subjected to a pulverizing process to make an average particle size to 10 μm or smaller after the first firing. Subsequently, they were burnt under the second firing conditions according to the description of the Table 1 to yield finally the sample.

TABLE 1

| Sample name | Composition | First burning condition | Second burning condition |
| --- | --- | --- | --- |
| Example 1 | $Li(Ni_{0.5}Ti_{0.5})_{0.1}Mn_{1.9}O_4$ | 650° C. × 10 hours | 800° C. × 24 hours |
| Example 2 | $Li(Ni_{0.5}Ti_{0.5})_{0.1}Mn_{1.9}O_4$ | 650° C. × 10 hours | (None) |
| Example 3 | $Li_{1.1}Mn_{1.9}O_4$ | 650° C. × 10 hours | 800° C. × 24 hours |
| Comparative Example | $LiMn_2O_4$ | 650° C. × 10 hours | 800° C. × 24 hours |

(Differential Thermal Analysis)

Differential thermal analysis of various lithium manganese oxide samples obtained was conducted by using a thermobalance named TG-DTA Thermoflex (high temperature type; made by Rigaku Denki, K. K.) under the conditions shown in Table 2. Experimental procedures were the same as normal ones applied by those skilled in the art.

TABLE 2

| | |
| --- | --- |
| Temperature measurement range | Room temperature-1200° C. |
| Temperature controlling thermocouple | PtRh13%-Pt |
| Heater | Platinum rhodium |
| Measurement atmosphere | In atmosphere |
| Measurement sample wt | 40 mg–50 mg |
| Sample container | 4 mmφ × 3 mm Alumina made pan |
| Reference sample | High purity alumina powder for thermal analysis |
| Temperature rising rate | 5° C./min |
| Sampling time | Every 5 sec. |

(Preparation of a Battery)

Various lithium manganese oxide samples prepared were mixed with acetylene black powder, which is an adjuvant for electric conduction, and polyvinylidene fluoride, which is a binding agent, in a weight ratio of 50:2:3 to prepare the positive material. The positive material of 0.02 g was subjected to press molding to make a disk shape with a diameter of 20 mm under a pressure of 300 kg/cm² to prepare the positive electrode. The coin cell was prepared by using this positive electrode, the electrolytic solution prepared by dissolving LiPF$_6$ as the electrolyte in an organic solvent, in which ethylene carbonate and diethyl carbonate were mixed in a equal volume proportion, to make a concentration of 1 mol/L, the negative electrode made from carbon, and the separator separating the positive from the negative electrode.

(Evaluation of Cycle Property)

The coin cell prepared was charged up to 4.1 V applying a constant current and a constant voltage of 1C rate according to capacity of the positive active material and discharged up to 2.5V by applying a constant current of the same 1 Crate. These charge and discharge make one cycle. The experiment was conducted for 100 cycles. The discharge capacity in the 100$^{th}$ cycle was divided by the first discharge capacity to yield a proportion that was used for evaluation of the cycle property.

(Test Result)

FIGS. 1(a) and (b) show the results of differential thermal analyses of the Example 1 and the Comparative Example, respectively. For the respective samples, Table 3 shows the strength ratio (P$_2$/P$_1$ strength ratio) of the primary endothermal peak (P$_1$) to the secondary endothermal peak (P$_2$) and the capacity proportion to the first discharge capacity at 100 cycles. Here, for the P$_2$/P$_1$ strength ratio, the length of a normal from the apex of the endothermal peak to a line was sought by the following steps: the point of start of the rise of respective endothermal peak was connected to the point of the end of the peak with the line, this length of the line was regarded as the strength of the endothermal peak, and the P$_2$ strength was divided by the P$_1$ strength obtained to yield the P$_2$/P$_1$ strength ratio.

TABLE 3

| Sample name | Composition | P$_2$/P$_1$ strength ratio | Discharge capacity proportion at 100 cycles |
| --- | --- | --- | --- |
| Example 1 | Li(Ni$_{0.5}$Ti$_{0.5}$)$_{0.1}$Mn$_{1.9}$O$_4$ | <0.1 | 0.90 |
| Example 2 | Li(Ni$_{0.5}$Ti$_{0.5}$)$_{0.1}$Mn$_{1.9}$O$_4$ | 0.5 | 0.88 |
| Example 3 | Li$_{1.1}$Mn$_{1.9}$O$_4$ | 0.9 | 0.81 |
| Comparative Example | LiMn$_2$O$_4$ | 1.0 | 0.53 |

As shown in the Table 3, the P$_2$/P$_1$ strength ratio was 1 and the discharge capacity proportion at 100 cycles was as small as 53% in the Comparative Example, pointing out a problem in the cycle property. On the other hand, as shown in the results of the Examples 1 to 3, the P$_2$/P$_1$ strength ratio was under 1 and the discharge capacity proportion at 100 cycles increased according to a decrease in the P$_2$/P$_1$ strength ratio. Thus, the cycle property was certainly improved.

Such difference in appearance of such endothermal peaks, particularly the minimal secondary endothermal peak may be due to a stabilized crystal structure to suppress release of oxygen and Li by heat. Improved cycle property by stabilized crystal structure may be based on a decrease in irreversibly changeable part of crystal structure due to moved Li ions according to charge and discharge.

In a comparison of the Examples 1 and 2 with Example 3, substitution of a part of Mn by two other elements provides prominent improvement of the cycle property than substitution by one element. Particularly, it is shown that when P$_2$/P$_1$ strength ratio was 0.5 or less, a good cycle property was obtained. Further, the comparison of the Example 1 with Example 2 shows the good cycle property in many number of times of firing even in the same composition. This may be caused by evenness of composition and improvement of crystallinity realized by increase in the number of times of firing.

As described before, the use of lithium manganese oxide spinel having a stable crystal structure, which differs in thermal property from conventional lithium manganese oxide spinel, gives an excellent cycle property to the lithium secondary battery of the present invention. In other words, the lithium secondary battery of the present invention provides a prominent effect in realizing a high capacity and a long life.

What is claimed is:

1. A lithium secondary battery, wherein lithium manganese oxide is used as a positive active material, said lithium manganese oxide having a cubic spinel structure of which strength ratio (P$_2$/P$_1$ strength ratio) of a primary endothermal peak (P$_1$) appearing around 950° C. and a secondary endothermal peak (P$_2$) appearing around 1100° C. in differential thermal analysis, is 0.5 or less, said lithium manganese oxide having a formula Li(M$_{1(x1)}$M$_{2(x2)}$M$_{3(x3)}$ . . . M$_{m(xm)}$)$_x$Mn$_{2-x}$O$_4$, wherein M$_1$ is Ti, M$_2$ is Li, and M$_3$ . . . M$_m$ are metals selected from the group consisting of Fe, Ni, Mg, Zn, Co, Cr, Sn, P, V, Sb, Nb, Ta, Mo and W, wherein x is a substituted amount greater than zero, wherein X$_1$ is greater than zero, wherein X$_2$ is greater than or equal to zero, wherein at least one of X$_3$, . . . and X$_m$ is greater than zero, and wherein a sum of X$_1$, X$_2$, X$_3$,. . . and X$_m$ is 1.

2. The lithium secondary battery according to claim 1, wherein said lithium manganese oxide is yielded by firing a mixture of salt(s) and/or oxide(s) of respective elements adjusted to a given proportion in an oxidation atmosphere, under a temperature in the range of 650 to 1000° C. and for a duration between 5 hours and 50 hours.

3. The lithium secondary battery according to claim 2, wherein said lithium manganese oxide is yielded by carrying out said firing at least twice or more.

4. The lithium secondary battery according to claim 3, wherein said lithium manganese oxide is yielded by gradually increasing a firing temperature as the number of times of firing increases.

5. The lithium secondary battery according to claim 1, wherein X$_2$ is greater than 0.

* * * * *